June 17, 1924.

J. H. KNAPP

HEATING FURNACE

Filed Oct. 1, 1921

1,498,240

INVENTOR
James H. Knapp
by his attorneys
Byrnes, Stebbins, Burgess & Parmelee

Patented June 17, 1924.

1,498,240

UNITED STATES PATENT OFFICE.

JAMES H. KNAPP, OF EDGEWORTH, PENNSYLVANIA, ASSIGNOR TO TATE, JONES & COMPANY, INC., OF PITTSBURGH, PENNSYLVANIA, A CORPORATION OF PENNSYLVANIA.

HEATING FURNACE.

Application filed October 1, 1921. Serial No. 504,583.

*To all whom it may concern:*

Be it known that I, JAMES H. KNAPP, a citizen of the United States, residing at Edgeworth, in the county of Allegheny and State of Pennsylvania, have invented a new and useful Improvement in Heating Furnaces, of which the following is a full, clear, and exact description.

The present invention relates to heating furnaces, and more particularly to under-fired heating furnaces such as are used for case hardening and heat treating metal articles.

The combustion takes place beneath the hearth in the furnace. The products of combustion are brought up at the sides of the hearth. Shields of heat resisting and conducting material are extended up from the sides of the hearth to shield the articles from direct side contact with the products of combustion. The products of combustion are taken from the heating furnace by flues at the lower part thereof adjacent to the hearth. These flues are preferably located in the door jambs, or in the door jambs and rear wall of the furnace.

In the drawings,—

Figure 1:
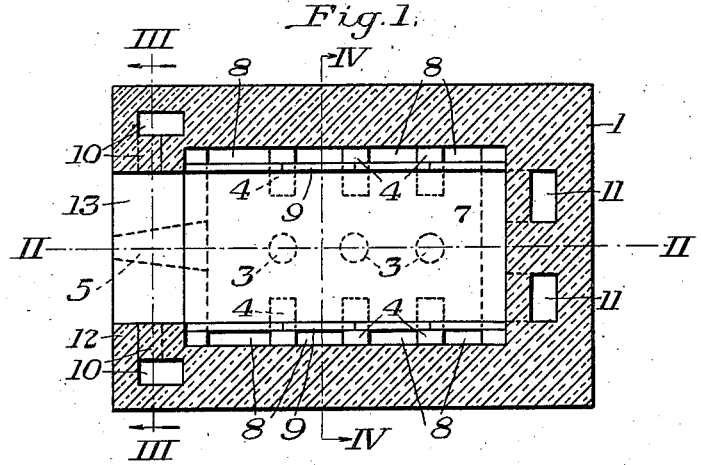
Figure 1 is a horizontal section along the line I—I of Figure 4, of a furnace embodying the invention.
Figure 2:
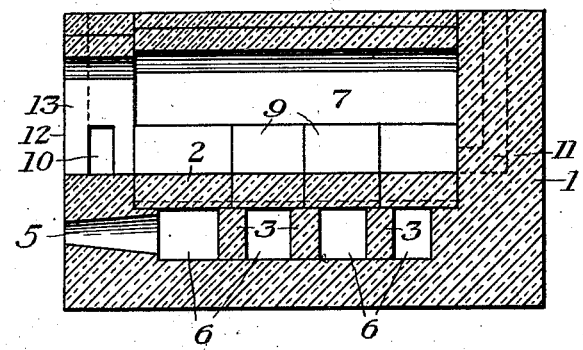
Figure 2 is a central longitudinal vertical section along the line II—II of Figure 1.
Figure 3:
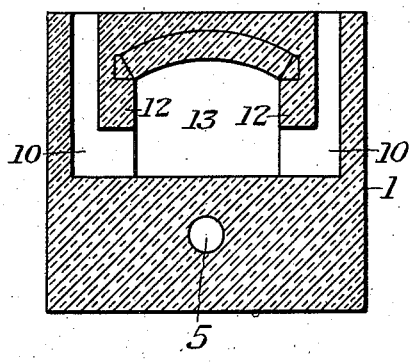
Figure 3 is a vertical section along the line III—III of Figure 1.
Figure 4:
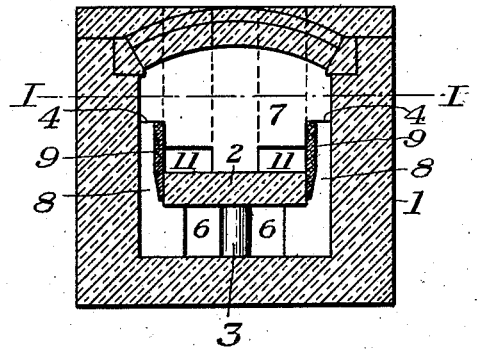
Figure 4 is another vertical section taken along the line IV—IV of Figure 1.

Referring to the illustrated embodiment of the invention, the furnace, indicated generally by the reference numeral 1, is of the under-fired type. The hearth 2 is supported by central columns 3 and side piers 4. The fuel, which is preferably oil or gas, is introduced through the burner opening 5 into the combustion chamber 6 beneath the hearth. The products of combustion pass from the combustion chamber 6 into the heating chamber 7 through the openings 8 between the sides of the hearth and the side walls of the furnace. Shields 9 of heat resisting and heat conducting material, extend up from the sides of the hearth 2 and serve to shield the article to be heated on the hearth from the direct draft of the products of combustion through the openings 8. These shields may be made of carborundum or may be made of other heat resisting metal. Carborundum is strong and may be made in comparatively thin sheets so that the heat is conducted through and cold spots along the inside of the shields are avoided. The waste gases are exhausted from the heating chamber 7 through outlet ports 10 and 11, which are located at the lower part of the heating chamber adjacent to the hearth level. In the illustrated embodiment, the outlet ports are placed at both ends of the furnace to insure substantially uniform distribution of the heat. The outlet ports may be otherwise arranged, as, for example, in a short furnace the outlet ports may be located at one end only, preferably at the door end. The outlet ports 10 in the door jambs 12 prevent local cooling at the door end of the heating chamber. The door opening is indicated at 13 and may be closed by any of the usual types of furnace doors, as will be readily understood by anyone skilled in this art.

The present invention is not limited to the details of its illustrated embodiment, but may be otherwise embodied in heating furnaces within the scope of the following claims.

I claim:

1. A heating furnace comprising a combustion chamber, a heating chamber above the combustion chamber, and outlet ports located at the lower part of the heating chamber and leading to the exterior of the furnace, substantially as described.

2. A heating furnace comprising a hearth, a combustion chamber below the hearth, a heating chamber above the hearth the latter constituting the top wall of one of the chambers and the bottom wall of the other, and outlet ports from the heating chamber all of which are located near the hearth level and lead to the exterior of the furnace, substantially as described.

3. An under-fired heating furnace having a heating chamber, and outlet ports for the waste gases located in the door jambs of the heating chamber and leading to the exterior of the furnace, substantially as described.

4. An under-fired heating furnace having a heating chamber, and outlet ports for the waste gases located in the door jambs of the heating chamber adjacent to the hearth level and leading to the exterior of the furnace, substantially as described.

5. A heating furnace having a chamber therein, a plurality of piers within the chamber and along the side walls of the furnace, a hearth supported on said piers and extending from the front to the rear ends of the furnace, there being open spaces between the sides of the hearth and adjacent piers, and thin sheets of heat resisting material supported on said piers at the sides of the hearth and extending upwardly above the hearth short of the top of the chamber for directing the products of combustion from below the hearth to a point above the hearth, and outlet openings all of which lead from the space above the hearth and from below the upper edges of the sheets of heat resisting material, substantially as described.

6. A heating furnace comprising a hearth, a combustion chamber beneath the hearth, a heating chamber above the hearth, an opening from the combustion chamber to the heating chamber, and an imperforate carborundum shield in the heating chamber adjacent said opening, substantially as described.

7. A heating furnace comprising a hearth, a combustion chamber below the hearth, a passage by the hearth from the combustion chamber to the heating chamber, an imperforate carborundum shield in the heating chamber adjacent to said opening, and outlet ports at the end of the heating chamber located below the top of the shield, substantially as described.

In testimony whereof I have hereunto set my hand.

JAMES H. KNAPP.